United States Patent [19]

Hori

[11] Patent Number: 5,152,008
[45] Date of Patent: Sep. 29, 1992

[54] SIGNAL CONTROL APPARATUS CAPABLE OF READILY CHANGING AN APPARATUS OUTPUT SIGNAL

[75] Inventor: Tsuguo Hori, Tokyo, Japan

[73] Assignee: NEC Corporation, Tokyo, Japan

[21] Appl. No.: 648,689

[22] Filed: Jan. 30, 1991

[30] Foreign Application Priority Data

Jan. 30, 1990 [JP] Japan .................... 2-17718
Jan. 30, 1990 [JP] Japan .................... 2-20324

[51] Int. Cl.⁵ ............................................. H04B 1/04
[52] U.S. Cl. ....................................... 455/127; 455/54.1
[58] Field of Search ................ 455/89, 90, 115, 117, 455/127, 343, 33, 54, 56

[56] References Cited

U.S. PATENT DOCUMENTS

| | | | |
|---|---|---|---|
| 4,442,407 | 4/1984 | Apel | 455/127 |
| 4,819,272 | 4/1989 | Shimo et al. | 455/127 |
| 5,003,619 | 3/1991 | Morris et al. | 455/127 |
| 5,056,109 | 10/1991 | Gilhousen et al. | 455/54 |
| 5,086,508 | 2/1992 | Furuno | 455/115 |

FOREIGN PATENT DOCUMENTS 0388895 9/1990 European Pat. Off.
2220808 1/1990 United Kingdom.

*Primary Examiner*—Curtis Kuntz
*Attorney, Agent, or Firm*—Sughrue, Mion, Zinn, Macpeak & Seas

[57] ABSTRACT

In a signal control apparatus for controlling an apparatus input signal to produce an apparatus output signal, a signal producing circuit (11) produces a reference signal in accordance with a plurality of original waveform signals generated by first and second generating circuits (31, 32). The reference signal is compared by a comparing circuit (13) with an output waveform signal which is produced by a detecting circuit (12) dependent on the apparatus output signal. The comparing circuit produces a difference signal representative of a difference between the reference signal and the output waveform signal. Under control of the difference signal, an amplifier (14) processes the apparatus input signal into the apparatus output signal.

5 Claims, 7 Drawing Sheets

SIGNAL CONTROL APPARATUS CAPABLE OF READILY CHANGING AN APPARATUS OUTPUT SIGNAL

BACKGROUND OF THE INVENTION

This invention relates to a signal control apparatus which is suitable for use in a time division multiple access communication network which is typically a mobile telephone system.

A conventional mobile telephone system comprises a base station and a plurality of mobile stations. The base station has a predetermined service area generally called a cell. The mobile stations are movable in the cell. The station can select a selected mobile one of the mobile stations for communication by the use of a radio signal.

When communication is carried out in the mobile telephone system, the radio signal is received as a received signal by the selected mobile station. In this event, it is desirable that the received signal has a received strength of predetermined value.

However, it is unavoidable that the received strength varies dependent on a distance between the base station and the selected mobile station. Namely, the received strength increases when the distance is short. When the received strength becomes extremely higher than the predetermined value, the communication is adversely affected.

In order to produce the radio signal, the base station includes a signal control apparatus already known. For example, a conventional signal control apparatus is disclosed in U.S. Pat. No. 4,592,073 issued to Kyoji Watanabe and assigned to NEC Corporation. The signal control apparatus is for controlling an apparatus input signal to produce an apparatus output signal and comprises a producing, a detecting, a comparing, and a processing circuits which will be described in the following.

The producing circuit is for producing a reference signal. The detecting circuit is for detecting the apparatus output signal to produce an output waveform signal representative of a waveform which the apparatus output signal has. The comparing circuit is for comparing the output waveform signal with the reference signal and produces a difference signal representative of a difference between the output waveform signal and the reference signal. The processing circuit is for processing the apparatus input signal into the apparatus output signal under control by the difference signal. The apparatus output signal is transmitted as the above-mentioned radio signal from the base station.

However, the conventional signal control apparatus has a disadvantage in that it is difficult to change a strength of the apparatus output signal as will be discussed in detail with reference to the drawing.

SUMMARY OF THE INVENTION

It is therefore an object of this invention to provide a signal control apparatus in which it is readily possible to change a strength of an apparatus output signal.

Other objects of this invention will become clear as the description proceeds.

On describing the gist of this invention, it is possible to understand that a signal control apparatus is for controlling an apparatus input signal to produce an apparatus output signal and includes signal producing means for producing a reference signal, detecting means for detecting the apparatus output signal to produce an output waveform signal, comparing means for comparing the output waveform signal with the reference signal to produce a difference signal representative of difference between the output waveform signal and the reference signal, and signal processing means for processing the apparatus input signal into the apparatus output signal under control of the difference signal.

According to this invention, the producing means of the above-understood signal control apparatus comprises signal generating means for generating a plurality of original waveform signals and internal producing means connected to the generating means for producing the reference signal in accordance with the original waveform signals.

DESCRIPTION OF THE PREFERRED EMBODIMENTS

Figure 1:
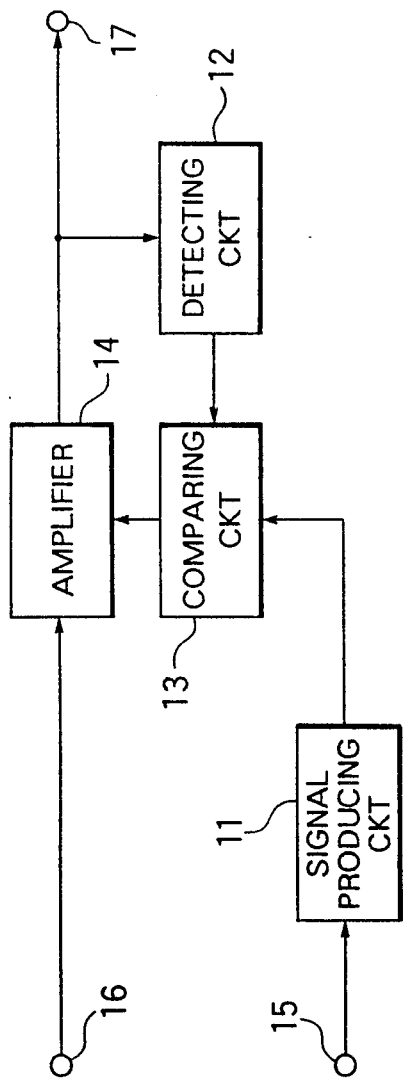
FIG. 1 is a block diagram of a conventional signal control apparatus.
Figure 2:
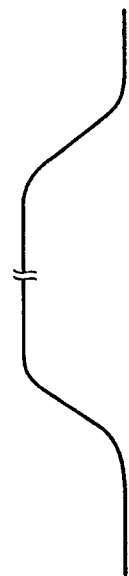
FIG. 2 shows a waveform for use in describing operation of the conventional signal control apparatus illustrated in FIG. 1.

Referring to FIGS. 1 and 2, a conventional signal control apparatus will be described at first for a better understanding of the present invention. The conventional signal control apparatus is for controlling an apparatus input signal to produce an apparatus output signal and comprises a signal producing circuit 11, a detecting circuit 12, a comparing circuit 13, and an amplifier 14 which will presently be described.

An output level control signal is supplied to the signal producing circuit 11 through a control signal input terminal 15. Responsive to the output level control signal, the signal producing circuit 11 produces a reference signal illustrated in FIG. 2. The detecting circuit 12 is for detecting the apparatus output signal to produce an output waveform signal representative of a waveform or envelope of the apparatus output signal. The comparing circuit 13 is connected to the signal producing and the detecting circuits 11 and 12 and is for comparing the output waveform signal with the reference signal to produce a difference signal representative of a difference between the output waveform signal and the reference signal.

The apparatus input signal is supplied to the amplifier 14 through a transmission signal input terminal 16. The amplifier 14 is connected to the comparing circuit 13 and is for processing the apparatus input signal into the apparatus output signal under control of the difference signal. The apparatus output signal is sent out through a transmission signal output terminal 17. The waveform of the apparatus output signal is similar to that of the reference signal. The amplifier 14 is referred to as a signal processing arrangement.

However, it is difficult to change a strength of the apparatus output signal. In other words, the conventional signal control apparatus produces the apparatus output signal which the waveform or envelope rendered simple. This is because the reference signal has a predetermined waveform which is simple as shown in FIG. 2.

Figure 3:
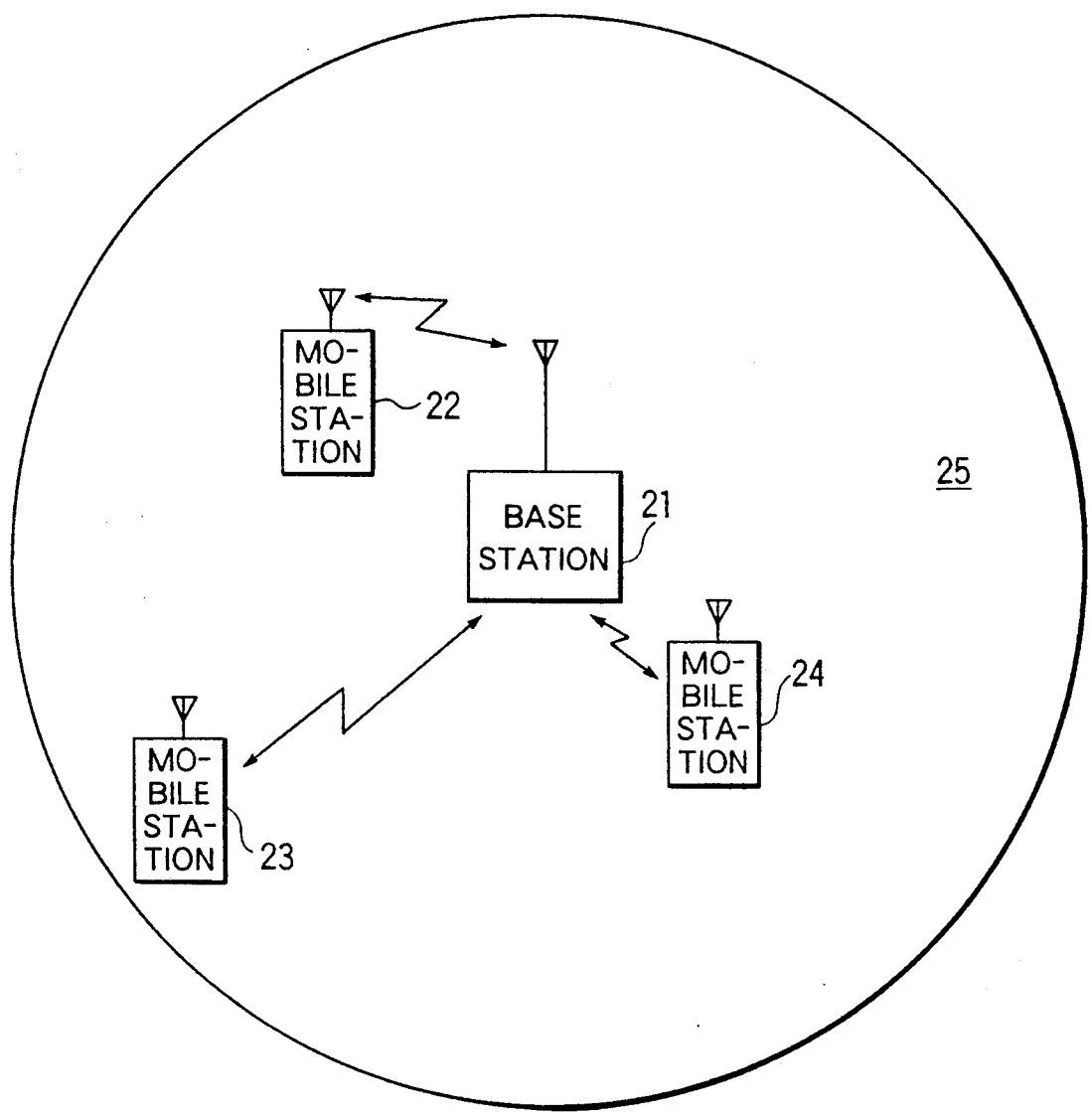
FIG. 3 is a schematic diagram of a mobile telephone system for use in describing this invention.

Referring to FIG. 3, description will be directed to a mobile telephone system to which this invention is applicable. The mobile telephone system comprises a base station 21 and a plurality of mobile stations 22, 23, and 24. The base station 21 has a predetermined service area 25. The mobile stations 22, 23, and 24 are movable in the predetermined service area 25. Communication can be carried out between the base station 21 and a selected mobile one of the mobile stations 22, 23, and 24 by the use of a radio signal.

When the communication is carried out in the mobile telephone system, the radio signal is received as a received signal by the selected mobile station. In this event, the received signal has a received strength which varies dependent on a distance between the base station and the selected mobile station.

Figure 4:
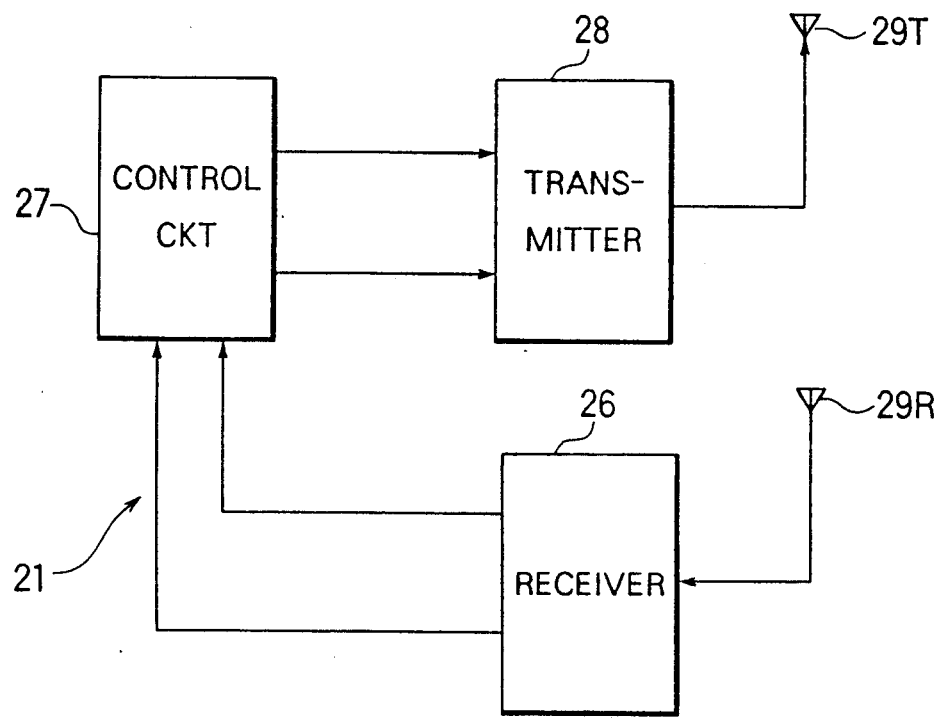
FIG. 4 is a block diagram of a base station included in the mobile telephone system illustrated in FIG. 3.

Referring to FIG. 4 together with FIG. 3, the base station 21 comprises a receiver 26, a control circuit 27, and a transmitter 28. Supplied with the radio signal through a receiving antenna 29R, the receiver 26 produces a demodulated signal and a reception input level signal. Supplied with the reception input level signal and the demodulated signal, the control circuit 27 produces an operation control and a level control signals. Responsive to the operation control and the level control signals, the transmitter 28 produces the radio signal. The radio signal is transmitted through a transmitting antenna 29T. The transmitter 28 comprises an original producing circuit (not shown) for producing the above-mentioned apparatus input signal in the manner known in the art.

Figure 5:
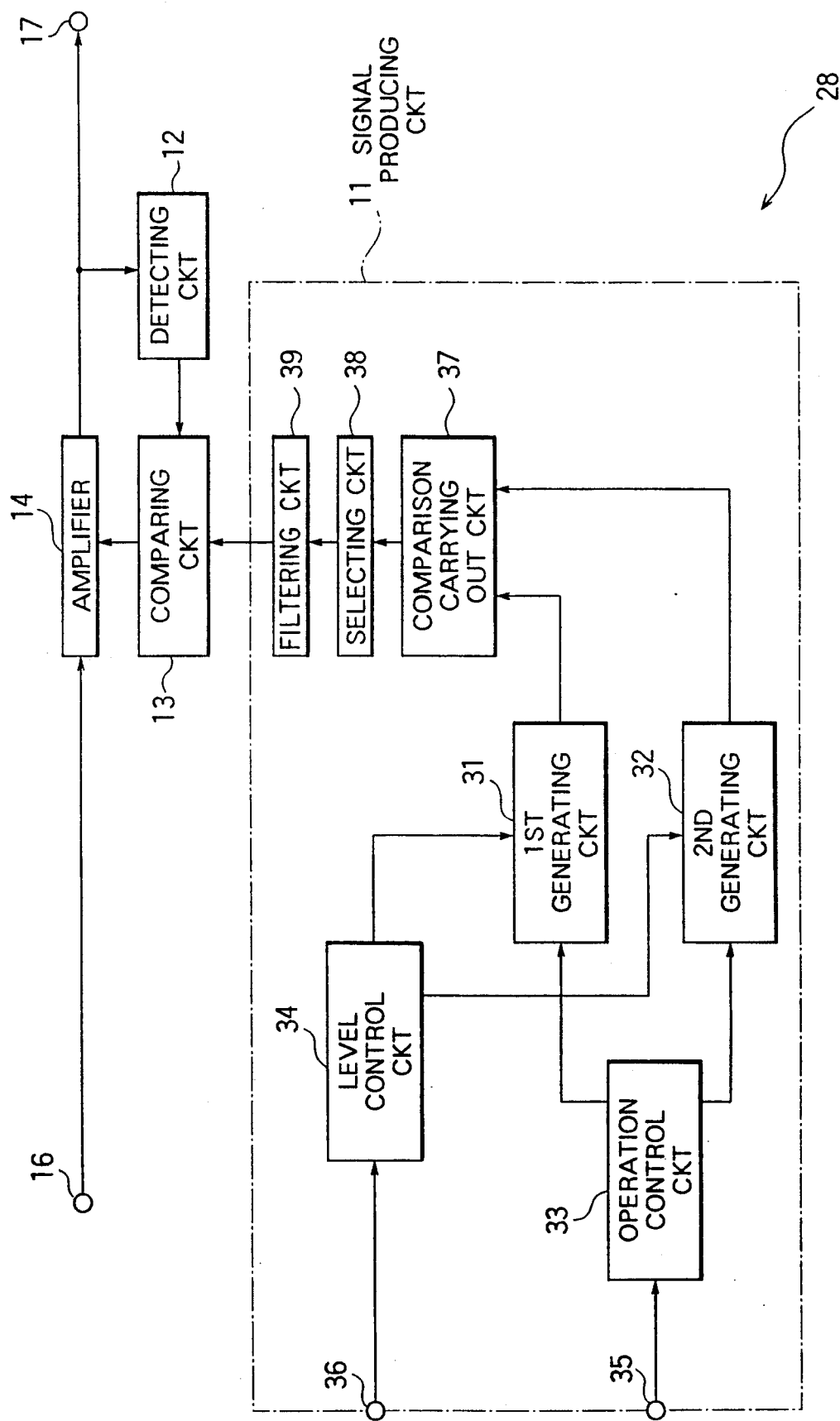
FIG. 5 is a block diagram of a signal control apparatus according to a first embodiment of this invention.

Referring to FIG. 5 together with FIG. 4, the description will be directed to a signal control apparatus according to a first embodiment of this invention. The signal control apparatus comprises similar parts designated by like reference numerals.

The signal producing circuit 11 is included in the transmitter 28 and comprises first generating, second generating, operation control, and level control circuits 31, 32, 33, and 34. The first and the second generating circuits 31 and 32 are for generating a first and a second original signal which will later become clear.

The operation control circuit 33 is supplied with the operation control signal from the control circuit 27 through an operation control terminal 35. Responsive to the operation control signal, the operation control circuit 33 produces a first and a second operation signal. The first and the second generating circuits 31 and 32 are connected to the operation control circuit 33 and are supplied with the first and the second operation signals, respectively.

The level control circuit 34 is supplied with the level control signal from the control circuit 27 through a level control terminal 36. Responsive to the level control signal, the level control circuit 34 produces a first and a second level signal. The first and the second generating circuits 31 and 32 are connected to the level control circuit 34 and are supplied with the first and the second level signals, respectively.

Supplied with the first operation signal, the first generating circuit 31 generates the first original signal under control of the first level signal. Responsive to the second operation control signal, the second generating circuit 32 generate the second original signal under control of the second level signal. Herein, each of the first and the second original signals will be referred to as an original waveform signal.

The signal control circuit 11 further comprises comparison carrying out, selecting, and filtering circuits 37, 38, and 39. The comparison carrying out circuit 37 is connected to the first and the second generating circuits 31 and 32. The selecting circuit 38 is connected to the comparison carrying out circuit 37. The filtering circuit 39 is connected to the selecting circuit 38 and the comparing circuit 13.

The first and the second original signals have various signal levels in the manner which will presently be illustrated. The first and the second original signals are supplied to the comparison carrying out circuit 37. The comparison carrying out circuit 37 is for carrying out comparison between the signal levels of the first and the second original signals to produce a result signal representative of a result of the comparison. The result signal is supplied to the selecting circuit 38 together with the first and the second original signals.

The selecting circuit 38 is for selecting, as a selected signal, one of the first and the second original signals. In the example being illustrated, selection is carried out in the selecting circuit 38 so that the selected signal has a signal level which is a higher one of the signal levels of the first and the second original signals. A combination of the comparison carrying out and the selecting circuits 37 and 38 may be referred to as a wave synthesizing circuit.

The selected signal has a selected waveform with leading and trailing edges and is supplied to the filtering circuit 39. The filtering circuit 39 is for smoothing the leading and the trailing edges of the selected waveform to process the selected signal into the above-mentioned reference signal. The filtering circuit 39 is referred to as an internal processing arrangement. A combination of the comparison carrying out, the selecting, and the filtering circuits 37, 38, and 39 is referred to as an internal producing arrangement.

Figure 6:
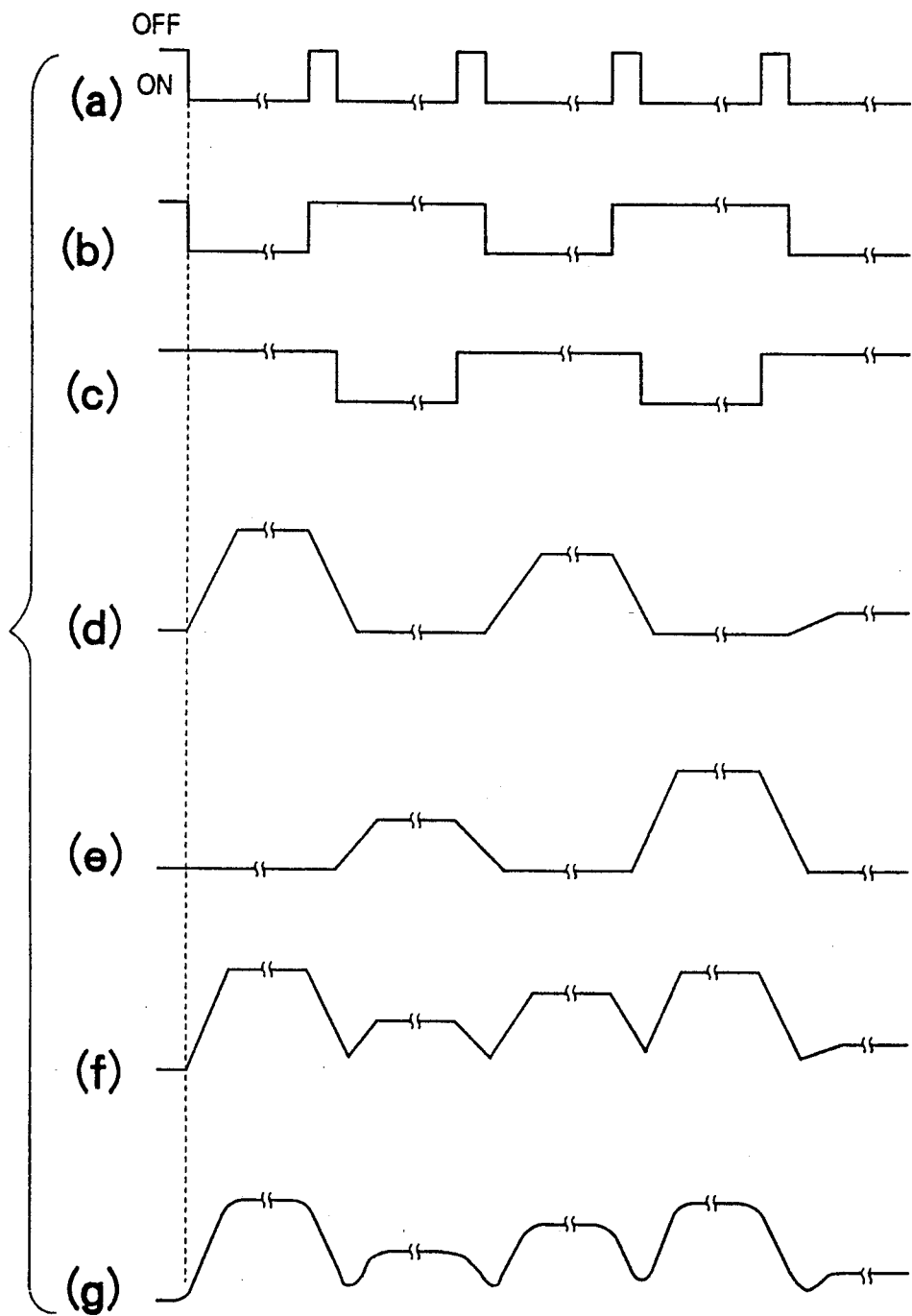
FIG. 6 is a time chart for use in describing operation of the signal control apparatus illustrated in FIG. 5.

Referring to FIG. 6, the operation control signal is depicted along a top or first line labelled (a). The first operation signal is depicted along a second line labelled (b). The second operation signal is depicted along a third line labelled (c). An example of the first original signal is depicted along a fourth line labelled (d). An example of the second original signal is depicted along a fifth line labelled (e). An example of the selected signal is depicted along a sixth line labelled at (f). An example of the reference signal is depicted along a seventh of bottom line labelled at (g). In the manner exemplified along the bottom line, the leading and the trailing edges of the reference signal are rounded by the filtering circuit 39.

Figure 7:
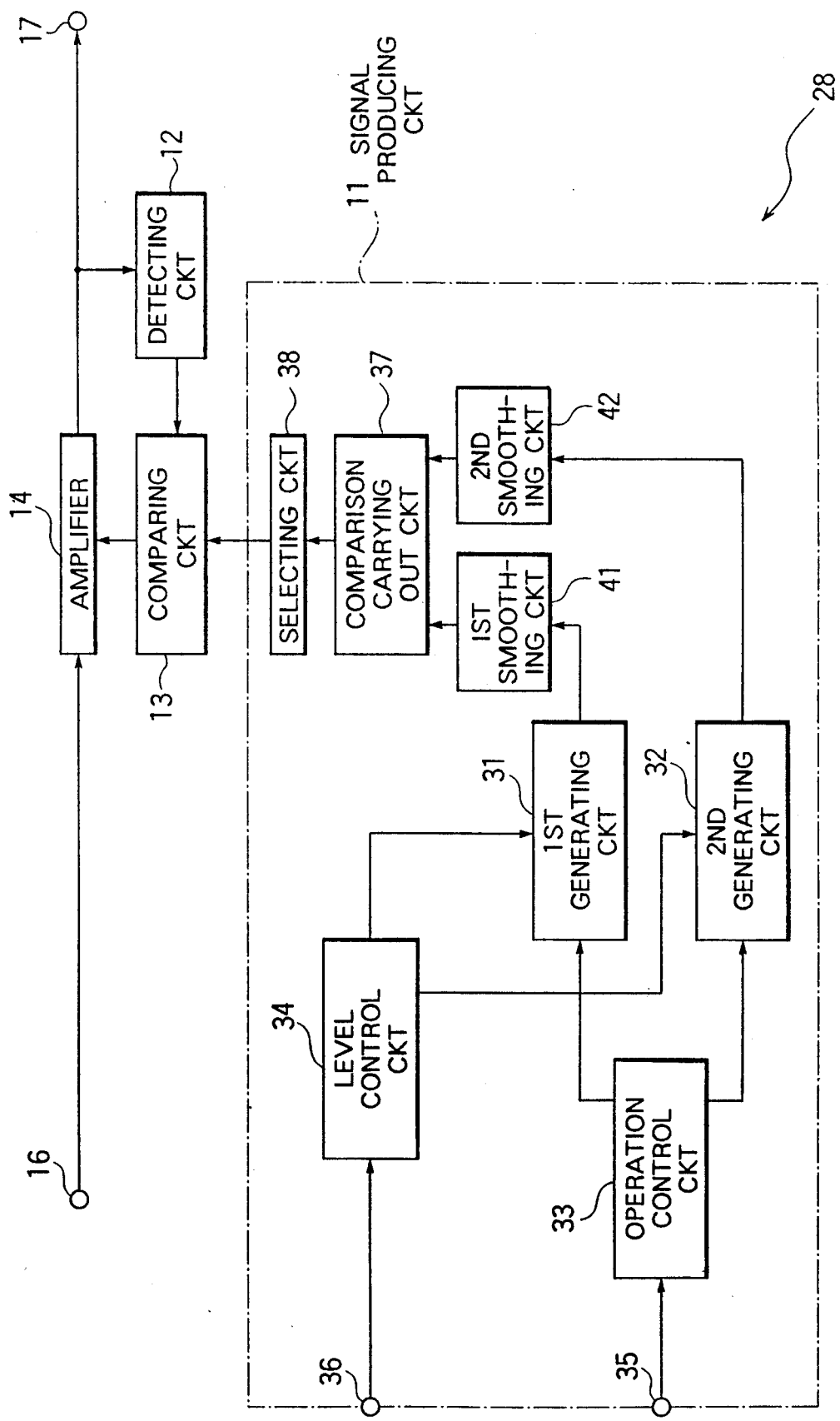
FIG. 7 is a block diagram of a signal control apparatus according to a second embodiment of this invention.

Referring to FIG. 7, the description will be directed to a signal control apparatus according to a second embodiment of this invention. The signal control apparatus comprises similar parts designated by like reference numerals.

The signal producing circuit 11 further comprises first and second smoothing circuits 41 and 42. The first smoothing circuit 41 is connected to the first generating and the comparison carrying out circuits 31 and 37. The second smoothing circuit 42 is connected to the second generating and the comparison carrying out circuits 32 and 37.

The first original signal has a first original waveform with leading and trailing edges and is supplied to the first smoothing circuit 41. The first smoothing circuit 41 is for smoothing each of the leading and the trailing edges of the first original waveform to process the first original signal into a first smoothed signal.

The second original signal has a second original waveform with leading and trailing edges and is supplied to the second smoothing circuit 42. The second smoothing circuit 41 is for smoothing the leading and the trailing edges of the second original waveform to process the second original signal into a second smoothed signal.

The first and the second smoothed signals have various signal levels in the manner which will shortly be illustrated. The first and the second smoothed signals are supplied to the comparison carrying out circuit 37. The comparison carrying out circuit 37 is for carrying out comparison between the signal levels of the first and the second smoothed signals to produce the above-mentioned result signal. The result signal is supplied to the selecting circuit 38 together with the first and the second smoothed signals.

The selecting circuit 38 is for selecting, as the above-mentioned selected signal, one of the first and the second smoothed signals. In the example being illustrated, selection is carried out in the selected circuit 38 so that the selected signal has a signal level which is a higher one of the signal levels of the first and the second smoothed signals. The selected signal is supplied as the above-mentioned reference signal to the comparing circuit 13.

Figure 8:
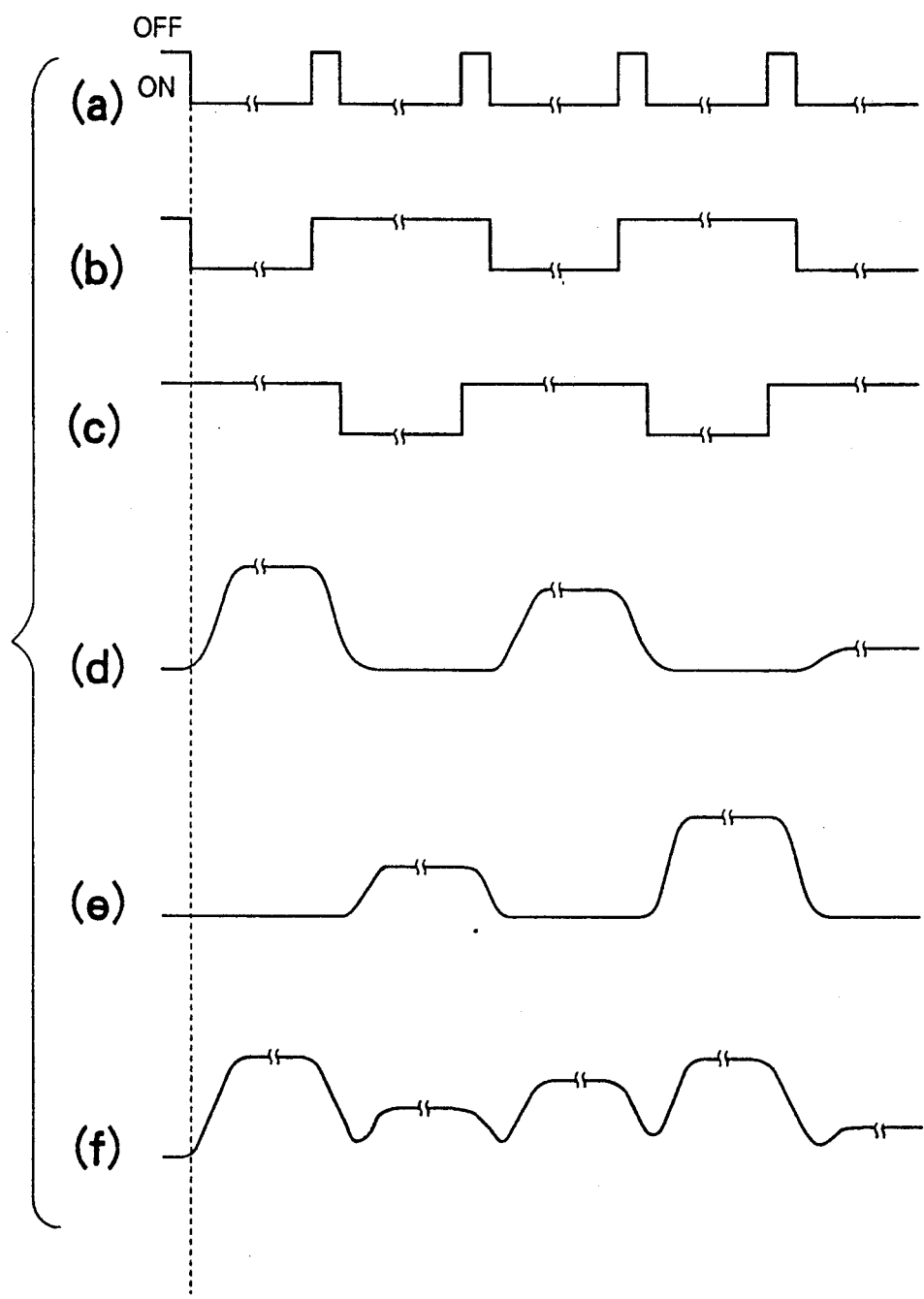
FIG. 8 is a time chart for use in describing operation of the signal control apparatus illustrated in FIG. 7.

Referring to FIG. 8, the operation control signal is depicted along a top or first line labelled (a). The first operation signal is depicted along a second line labelled (b). The second operation signal is depicted along a third line labelled (c). An example of the first smoothed signal is depicted along a fourth line labelled (d). An example of the second smoothed signal is depicted along a fifth line labelled (e). An example of the reference signal is depicted along a sixth of bottom line labelled at (f). In the manner exemplified along each of the fourth and the fifth lines, the leading and the trailing edges of each of the first and the second smoothed signals are rounded. As a result, the leading and the trailing edges of the reference signal are also rounded as will be understood from the bottom line.

While the present invention has thus far been described in connection with only a few embodiments thereof, it will readily be possible for those skilled in the art to put this invention into practice in various other manners. For example, the signal control apparatus may comprise three or more generating circuits. Although the description has been made as regards the mobile telephone system, the signal control apparatus is applicable to various kinds of time division multiple access communication network.

What is claimed is:

1. A signal control apparatus for controlling an apparatus input signal to produce an apparatus output signal, including signal producing means for producing a reference signal, detecting means for detecting said apparatus output signal to produce an output waveform signal representative of a waveform of said apparatus output signal, comparing means for comparing said output waveform signal with said reference signal to produce a difference signal representative of a difference between said output waveform signal and said reference signal, and signal processing means for processing said apparatus input signal into said apparatus output signal under control of said difference signal, wherein said signal producing means comprises:

signal generating means for generating a plurality of original waveform signals; and internal producing means connected to said generating means for producing said reference signal in accordance with a selected one of said original waveform signals.

2. A signal control apparatus for controlling an apparatus input signal to produce an apparatus output signal, including signal producing means for producing a reference signal, detecting means for detecting said apparatus output signal to produce an output waveform signal representative of a waveform of said apparatus output signal, comparing means for comparing said output waveform signal with said reference signal to produce a difference signal representative of a difference between said output waveform signal and said reference signal, and signal processing means for processing said apparatus input signal into said apparatus output signal under control of said difference signal, wherein said signal producing means comprises:

signal generating means for generating a plurality of original waveform signals which have signal levels, respectively;

internal producing means connected to said generating means for producing said reference signal in accordance with a selected one of said original waveform signals, said internal producing means comprising:

comparison carrying out means connected to said signal generating means for carrying out comparison among said signal levels to produce a result signal representative of said comparison;

selecting means connected to said comparison carrying out means for selecting, as a selected signal, one of said original waveform signals with reference to said result signal; and internal processing means connected to said selecting and said comparing means for processing said selected signal into said reference signal.

3. A signal control apparatus as claimed in claim 2, wherein said selected signal has a selected waveform with leading and trailing edges, said internal processing means smoothes each of said leading and said trailing edges.

4. A signal control apparatus as claimed in claim 2, wherein each of said original waveform signals has an original waveform with leading and trailing edges, said internal producing means further comprising smoothing means connected to said comparison carrying out and said signal generating means for smoothing each of said leading and said trailing edges.

5. A signal control apparatus for controlling an apparatus input signal to produce an apparatus output signal, including signal producing means for producing a reference signal, detecting means for detecting said apparatus output signal to produce an ouput waveform signal representative of a waveform of said apparatus output signal, comparing means for comparing said output waveform signal with said reference signal to produce a difference signal representative of a difference between said output waveform signal and said reference signal, and signal processing means for processing said apparatus input signal into said apparatus output signal under control of said difference signal, wherein said signal producing means comprises:

signal generating means for generating a plurality of original waveform signals;

internal producing means connected to said generating means for producing said reference signal in accordance with said original waveform signals, said signal generating means comprising:

first generating means connected to said internal producing means for generating a first original signal as a particular one of said original waveform signals;

second generating means connected to said internal processing means for generating a second original signal as a specific one of said original waveform signals;

operation control means connected to said first and said second generating means for controlling said first and said second generating means to make said particular and said specific ones of the original waveform signals have a predetermined relationship; and level control means connected to said first and said second generating means for comtrolling said first and said second generating means so that said particular and said specific ones of the original waveform signals have a particular and a specific level, respectively.

* * * * *